United States Patent

Kawahara

[15] 3,663,394
[45] May 16, 1972

[54] PROCESS FOR THE VAPOR PHASE REARRANGEMENT OF HYDROCARBONS UTILIZING MICROWAVE ENERGY

[72] Inventor: Yoshio Kawahara, Midland, Mich.

[73] Assignee: The Dow Chemical Company, Midland, Mich.

[22] Filed: June 1, 1970

[21] Appl. No.: 42,493

[52] U.S. Cl.....................204/168, 204/170, 204/171
[51] Int. Cl..............................C07b 29/06, C07c 3/48
[58] Field of Search...........................204/168, 170, 171

[56] References Cited

UNITED STATES PATENTS

| | | | |
|---|---|---|---|
| 1,799,787 | 4/1931 | Feiler | 204/170 |
| 2,257,177 | 9/1941 | Luster | 204/168 |
| 3,432,413 | 3/1969 | Vanderhoff | 204/168 X |

FOREIGN PATENTS OR APPLICATIONS

| | | | |
|---|---|---|---|
| 299,861 | 6/1929 | Great Britain | 204/170 |

*Primary Examiner*—F. C. Edmundson
*Attorney*—Griswold & Burdick, J. Roger Lochhead and C. E. Rehberg

[57] ABSTRACT

A process for the vapor phase rearrangement of hydrocarbons is disclosed wherein said hydrocarbons are subjected to a microwave electrical discharge maintained by an incident power of from about 500 watts to about 5 megawatts, said feed having a residence time of no more than about 0.02 seconds, residence time being defined as the time required for a molecule to travel through the visible glow discharge zone in a given reactor.

3 Claims, No Drawings

PROCESS FOR THE VAPOR PHASE REARRANGEMENT OF HYDROCARBONS UTILIZING MICROWAVE ENERGY

BACKGROUND OF THE INVENTION

It has been known for many years that an electrical discharge technique is an effective and convenient method to produce free radicals and atomic species by the dissociation of molecular gases. In recent years, microwave discharge energy has been investigated as a potential tool in chemical processing. However, this research, to date, has been merely a laboratory curiosity, and has not been explored insofar as its commercial applicability to the chemical industry is concerned.

SUMMARY OF THE INVENTION

The instant invention, then, is a process for the vapor phase rearrangement of hydrocarbons, the process comprising subjecting one or more hydrocarbons to a microwave electrical discharge maintained by an incident microwave power of from about 500 watts to about 5 megawatts, said hydrocarbon having a residence time in the discharge of no more than about 0.02 seconds (preferably about 0.002 seconds), and recovering the products of said process.

Suitable hydrocarbon feeds include one or more saturated or ethylenically unsaturated aliphatic hydrocarbons, straight or branch chained, having from one to 16 carbon atoms. For instance, methane, ethane, propanes, butanes, pentanes, hexanes, heptanes, octanes, decanes, tridecanes, hexadecanes, ethylene, propylene, butadiene, and the like are suitable.

Residence time is herein defined as that time required for a molecule to travel through the visible glow discharge zone in a given reactor under certain conditions.

Residence time ($T$) may further be defined by the formula $$T = \frac{a \times l \times p \times 3600}{V_m \times 760 \times F}$$

wherein:
$a$ = cross-sectional area of the discharge zone (cm.$^2$);
$l$ = length of the discharge zone (cm.);
$p$ = pressure of feed (Torr);
$V_m$ = gram molar volume of feed (cm.$^3$); and
$F$ = mass flow rate of feed (gram moles/hour).

Feed mass flow rates of at least about 0.1 mole/hour are suitable, the preferred flow rate being calculated from the above formula when the discharge volume ($a \times l$) and other variables are determined. It is to be noted that if the mass flow rate of the feed is too high, the process is still operable, although a quantity of feed will flow through the discharge zone unreacted.

Pressures of at least about 1.0 Torr up to about 1 atmosphere are suitable, the optimum pressure for any given reaction scheme varying as the power, mass flow rate and feed vary.

Incident powers of from about 500 watts to about 5 megawatts are suitable. The commercial economics of a given reaction scheme will dictate the magnitude of power.

As in any process, the operating conditions are interrelated. For instance, when methane is rearranged by the process of this invention, one finds that power and pressure are directly proportional to $CH_4$ conversion and $C_2H_2$ yield, and inversely proportional to $C_2H_4$ yield. On the other hand, flow rate is vice-versa with respect to the above.

The temperature of the feed prior to introduction to the discharge zone is critical only to the extent that the feed must be in the vapor phase. A thermal pre-heater section may be utilized if necessary.

There is disclosed, then, a fast-flow reaction system involving microwave energy as the reaction initiating means, said system having applicability to commercial processes.

SPECIFIC EMBODIMENTS

The reactions were carried out in a Vycor reaction tube (10.6 mm. I.D.) which was equipped with a cooling jacket (25 mm. O.D.) its full length (1 m.), constituting a part of a fast-flow system. The feed was metered with a capillary flow-meter calibrated against a wet test meter. The pressure of the gas in the flow system was monitored by a fused quartz Bourdon gauge. A gas flow of finely controlled pressure and flow rate was obtained by adjusting a number of fine-metering needle valves located both upstream and downstream from the reaction tube.

$CCl_4$ was rapidly circulated through the cooling jacket to cool the reaction products, the $CCl_4$ being cooled by means of an ice bath.

The power source for the discharge was a microwave generator delivering a fixed frequency, continuous wave at 2,450 MHz. The output from this generator was guided through a power monitor and tuner unit. A monitor meter combined with a detector unit indicated both incident and reflected powers. The incident microwave power was then coupled to the gas flowing in a reaction tube through a tapered matching section, the resonator cavity of which was in the general shape of a tuning fork 10 mm. thick, i.e., 10 mm. of reaction tube was exposed to the resonator cavity.

It was found that the pressure of the reaction zone rose somewhat due to the composition and temperature changes caused by the reaction, reaching a steady value within a few seconds.

After the discharge reaction, the product gas mixture was collected in a sample tube located downstream and was analyzed using mass spectrometry. Representative runs are illustrated, with conditions and major products, in the following table.

FEED: METHANE

| Run No. | Power (kw.) | Pressure (torr) | Flow rate (mole/hr.) | Residence time (millisec.) | $CH_4$ conversion (percent) | Percent yield based on feed ($CH_4$) | | | |
|---|---|---|---|---|---|---|---|---|---|
| | | | | | | $C_2H_2$ | $C_2H_4$ | $C_2H_6$ | $C_4H_2$ |
| 1 | 0.5 | 10 | 0.97 | 9.0 | 88.4 | 58.6 | 3.0 | 1.2 | 11.9 |
| 2 | 1.0 | 10 | 4.56 | 2.05 | 58.1 | 25.7 | 11.4 | 5.1 | 3.6 |
| 3 | 1.0 | 40 | 8.0 | 1.58 | 27.1 | 17.0 | 17.0 | 3.2 | 3.6 |
| 4 | 1.4 | 10 | 4.56 | 2.42 | 82.8 | 48.2 | 5.2 | 2.0 | 11.5 |
| 5 | 1.4 | 25 | 8.0 | 1.86 | 64.6 | 38.4 | 6.6 | 1.7 | 6.6 |
| 6 | 1.4 | 40 | 9.5 | 2.28 | 42.5 | 25.0 | 5.8 | 1.8 | 4.9 |
| 7 | 2.0 | 20 | 8.0 | 2.23 | 85.2 | 62.4 | 3.5 | 0.7 | 11.3 |
| 8 | 2.0 | 20 | 11.2 | 1.60 | 67.3 | 40.2 | 6.6 | 1.7 | 7.5 |
| 9 | 2.0 | 30 | 8.0 | 2.2 | 88.6 | 69.1 | 2.2 | 0.3 | 10.4 |
| 10 | 2.0 | 30 | 11.2 | 1.60 | 74.2 | 51.2 | 3.6 | 0.8 | 8.4 |
| 11 | 2.5 | 10 | 9.5 | 1.67 | 72.8 | 44.0 | 7.8 | 3.1 | 8.9 |
| 12 | 2.5 | 30 | 9.5 | 2.42 | 79.4 | 57.6 | 4.9 | 0.7 | 9.5 |
| 13 | 2.5 | 20 | 9.5 | 1.45 | 50.1 | 25.9 | 9.8 | 2.9 | 5.5 |

FEED: ETHANE

| Run No. | Power (kw.) | Pressure (torr) | Flow rate (mole/hr.) | Residence time (millisec.) | $C_2H_6$ conversion (percent) | Percent yield based on feed ($C_2H_6$) | | | |
|---|---|---|---|---|---|---|---|---|---|
| | | | | | | $CH_4$ | $C_2H_2$ | $C_2H_4$ | $C_4H_2$ |
| 14 | 0.5 | 10 | 2.09 | 4.5 | 57.7 | 6.7 | 13.6 | 30.3 | 1.4 |
| 15 | 0.5 | 10 | 1.56 | 6.0 | 83.7 | 9.9 | 24.3 | 20.6 | 2.9 |
| 16 | 0.5 | 10 | 0.91 | 10.4 | 98.0 | 9.1 | 49.3 | 12.7 | 8.9 |

Heavier feeds, such as butanes, pentanes, hexanes, heptanes, octanes, and the like, alone or in combination, are similarly rearranged. It may be necessary to add a pre-heater section to the equipment in order to vaporize the feed prior to introduction to the microwave zone.

I CLAIM:

1. A process for the vapor phase rearrangement of one or more saturated or ethylenically unsaturated aliphatic hydrocarbons having from one to 16 carbon atoms, said process comprising subjecting said hydrocarbon, at a pressure of at least 1 Torr up to about 1 atmosphere, to a microwave electrical discharge maintained by an incident microwave power of from 500 watts to about 5 megawatts, said hydrocarbons having a residence time in the discharge of no more than about 0.02 seconds, and recovering the products of said process.

2. The process of claim 1 wherein the residence time is no more than about 0.002 seconds.

3. The process of claim 1 wherein the mass flow rate of the hydrocarbon feed is at least about 0.1 gram mole per hour.

* * * * *